US012362916B2

United States Patent
Koikara et al.

(10) Patent No.: US 12,362,916 B2
(45) Date of Patent: Jul. 15, 2025

(54) PROVIDING CONNECTION DATA TO NETWORK DEVICES FOR CONTENT INSPECTION AND REPLAY ATTACK MITIGATION

(71) Applicant: Cisco Technology, Inc., San Jose, CA (US)

(72) Inventors: George Mathew Koikara, Bangalore (IN); Apoorv Raj, Nagpur (IN); Shibin Kandacheri Veedu, Kannur (IN)

(73) Assignee: Cisco Technology, Inc., San Jose, CA (US)

( * ) Notice: Subject to any disclaimer, the term of this patent is extended or adjusted under 35 U.S.C. 154(b) by 644 days.

(21) Appl. No.: 17/484,884

(22) Filed: Sep. 24, 2021

(65) Prior Publication Data

US 2023/0093942 A1 Mar. 30, 2023

(51) Int. Cl.
*H04L 9/08* (2006.01)
*H04L 9/06* (2006.01)
(Continued)

(52) U.S. Cl.
CPC .......... *H04L 9/0825* (2013.01); *H04L 9/0643* (2013.01); *H04L 9/3242* (2013.01);
(Continued)

(58) Field of Classification Search
None
See application file for complete search history.

(56) References Cited

U.S. PATENT DOCUMENTS 7,181,017 B1 * 2/2007 Nagel ............... H04L 9/302
380/282
7,480,500 B1 * 1/2009 Mittal ............... H04L 67/147
455/426.2
(Continued)

FOREIGN PATENT DOCUMENTS

CN 1701304 A * 11/2005 ......... H04L 12/4641
CN 103532987 A * 1/2014
(Continued)

OTHER PUBLICATIONS

Cliff C. Zou, Don Towsley and Weibo Gong; (A Firewall Network System for Worm Defense in Enterprise Networks); pp. 15; Published in Feb. 4, 2004.*

*Primary Examiner* — Ali H. Cheema
(74) *Attorney, Agent, or Firm* — Lee & Hayes, P.C.

(57) ABSTRACT

Techniques are described for providing data such as, for example, keys, connection identifiers, and hashes to network devices using a secure database in order to facilitate client devices remaining connected or reconnecting with network sites when the client device moves among networks and to prevent replay attacks. For example, a method may include receiving, by a network device of a first network, encrypted traffic destined for a network site via the first network from a client device. The method may also include retrieving, by the network device from a database, data related to a previously established connection via a second network of the client device to the network site. In configurations, the data is received by the database from a proxy on the client device. The method may further include based at least in part on the data, passing, by the network device, the encrypted traffic to the network site.

18 Claims, 5 Drawing Sheets

(51) Int. Cl.
*H04L 9/32* (2006.01)
*H04L 67/561* (2022.01)
*H04L 9/14* (2006.01)

(52) U.S. Cl.
CPC .............. *H04L 67/561* (2022.05); *H04L 9/14* (2013.01); *H04L 9/3239* (2013.01); *H04L 2209/76* (2013.01)

(56) References Cited

U.S. PATENT DOCUMENTS

| | | | | |
|---|---|---|---|---|
| 7,574,736 | B2 * | 8/2009 | Salapaka | H04L 63/029 726/13 |
| 8,769,260 | B1 * | 7/2014 | Kwan | H04L 63/0471 713/153 |
| 9,419,942 | B1 * | 8/2016 | Buruganahalli | H04L 63/1416 |
| 10,051,001 | B1 * | 8/2018 | Ashley | H04L 63/083 |
| 10,749,899 | B1 | 8/2020 | Du Toit et al. | |
| 2002/0152429 | A1 * | 10/2002 | Bergsten | G06F 11/1471 714/43 |
| 2003/0018788 | A1 * | 1/2003 | Zsohar | H04L 63/0209 709/227 |
| 2005/0198499 | A1 * | 9/2005 | Salapaka | H04L 63/029 713/160 |
| 2006/0018264 | A1 * | 1/2006 | Yamakawa | H04L 63/145 370/241 |
| 2007/0248085 | A1 * | 10/2007 | Volpano | H04L 63/0272 370/389 |
| 2007/0275718 | A1 * | 11/2007 | Descombes | H04M 15/47 455/435.1 |
| 2009/0136040 | A1 * | 5/2009 | Oishi | H04L 9/3236 380/277 |
| 2010/0037311 | A1 * | 2/2010 | He | H04L 63/20 709/227 |
| 2012/0135726 | A1 * | 5/2012 | Luna | H04L 47/25 455/422.1 |
| 2013/0091273 | A1 * | 4/2013 | Ly | H04L 67/147 709/224 |
| 2013/0091350 | A1 * | 4/2013 | Gluck | G06F 16/9535 713/153 |
| 2014/0362702 | A1 * | 12/2014 | Luna | H04L 67/568 370/235 |
| 2015/0058916 | A1 * | 2/2015 | Rostami-Hesarsorkh | H04L 63/168 726/1 |
| 2015/0241941 | A1 * | 8/2015 | Luna | H04W 52/0229 713/320 |
| 2017/0180316 | A1 * | 6/2017 | Teng | H04L 63/105 |
| 2017/0289104 | A1 * | 10/2017 | Shankar | H04L 63/166 |
| 2018/0007038 | A1 | 1/2018 | Hsu et al. | |
| 2018/0234256 | A1 * | 8/2018 | Bowen | H04L 63/0823 |
| 2018/0351997 | A1 | 12/2018 | Lee et al. | |
| 2020/0045016 | A1 * | 2/2020 | Chor | H04L 63/0442 |
| 2020/0177631 | A1 | 6/2020 | Reddy et al. | |
| 2020/0412551 | A1 | 12/2020 | Gero et al. | |
| 2021/0119966 | A1 * | 4/2021 | Kenyan | H04L 9/0891 |
| 2022/0103573 | A1 * | 3/2022 | Corella | H04L 63/1425 |
| 2022/0321667 | A1 * | 10/2022 | Ben-Shimon | H04L 5/0055 |

FOREIGN PATENT DOCUMENTS

| | | | | |
|---|---|---|---|---|
| CN | 109413201 B | * | 6/2021 | ......... H04L 63/0428 |
| JP | 2002024223 A | * | 1/2002 | |
| KR | 20110038638 A | * | 4/2011 | |

* cited by examiner

200 ↘

```
┌─────────────────────────────────────────────────────────────────┐
│  RECEIVE, BY A NETWORK DEVICE OF A FIRST NETWORK, ENCRYPTED     │
│  TRAFFIC DESTINED FOR A NETWORK SITE VIA THE FIRST NETWORK      │
│  FROM A CLIENT DEVICE                                            │
│                                                                  │
│                              202                                 │
└─────────────────────────────────────────────────────────────────┘
                                  │
                                  ▼
┌─────────────────────────────────────────────────────────────────┐
│  RECEIVE BY THE NETWORK DEVICE FROM A DATABASE, DATA RELATED    │
│  TO A PREVIOUSLY ESTABLISHED CONNECTION VIA A SECOND NETWORK    │
│  OF THE CLIENT DEVICE TO THE NETWORK SITE, WHEREIN THE DATA IS  │
│  RECEIVED BY THE DATABASE FROM A PROXY ON THE CLIENT DEVICE     │
│                                                                  │
│                              204                                 │
└─────────────────────────────────────────────────────────────────┘
                                  │
                                  ▼
┌─────────────────────────────────────────────────────────────────┐
│  BASED AT LEAST IN PART ON THE DATA, PASS, BY THE NETWORK       │
│  DEVICE, THE ENCRYPTED TRAFFIC TO THE NETWORK SITE              │
│                                                                  │
│                              206                                 │
└─────────────────────────────────────────────────────────────────┘
```

FIG. 2

PROVIDING CONNECTION DATA TO NETWORK DEVICES FOR CONTENT INSPECTION AND REPLAY ATTACK MITIGATION

TECHNICAL FIELD

The present disclosure relates generally to providing data such as, for example, hashes, keys and connection identifiers to network devices such as, for example, firewalls, using a secure database in order to facilitate client devices remaining connected or reconnecting with network sites when the client device moves among networks and to prevent replay attacks.

BACKGROUND

The Transport Layer Security (TLS) 1.3 protocol and the QUIC protocol introduce a concept of Zero Round Trip Time Resumption (0-RTT) or pre-shared keys. These pre-shared keys are pre-negotiated at an earlier point in time and used to send a first reconnection packet in encrypted form over a network so that intermediary devices of the network are not able to observe and interpret the traffic. TLS proxy solutions currently exist that replace the pre-shared keys and certificates of the TLS session on the fly so that the TLS proxy solutions are able to intercept and observe the traffic. However with 0-RTT or pre-shared keys, such a mechanism fails as the keys may have been negotiated outside of an enterprise network and when such keys are used to re-establish connection to the server from within the enterprise network, network devices such as, for example, firewall devices or other security devices, are unable to decrypt traffic as the network devices do not possess the 0-RTT keys.

The QUIC protocol introduces a concept of connection identifiers that allow connections to be migrated without having to re-negotiate the TLS session credentials even if the Internet Protocol (IP) address of the endpoint has changed. Additionally, multiple connection identifiers may be associated with a single application and any of these connection identifiers may be used to re-establish the communication with the external server. This makes the inspection on the network devices such as, for example, firewall devices or other security devices, difficult since such network devices tend to keep track of sessions based on the IP addresses of the endpoints and relying on the TLS re-negotiation to intercept the traffic.

The concept of 0-RTT in the TLS 1.3 protocol and the QUIC protocol also introduces a problem of replay attacks. An attacker may capture a 0-RTT key encrypted message and replay it at a later point in time to the intended endpoint, e.g., an application server. Currently the application server needs to validate if such a message was already received by the application server and discard the message if it is a replay of an earlier message, e.g., has already been received by the application server. This implies that applications that move to the more secure TLS 1.3 protocol or QUIC protocol either have to disable support for 0-RTT messages or modify the applications to detect such attacks. Dropping support for 0-RTT messages means the benefits of faster transactions are lost. Furthermore, modifying the applications is expensive.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a flow diagram of an example method for providing connection data such as, for example, keys and connection identifiers to network devices such as, for example, firewalls, using a secure database in order to facilitate client devices remaining connected or reconnecting with network sites when the client device moves among networks.

DESCRIPTION OF EXAMPLE EMBODIMENTS

Overview

Figure 1A:
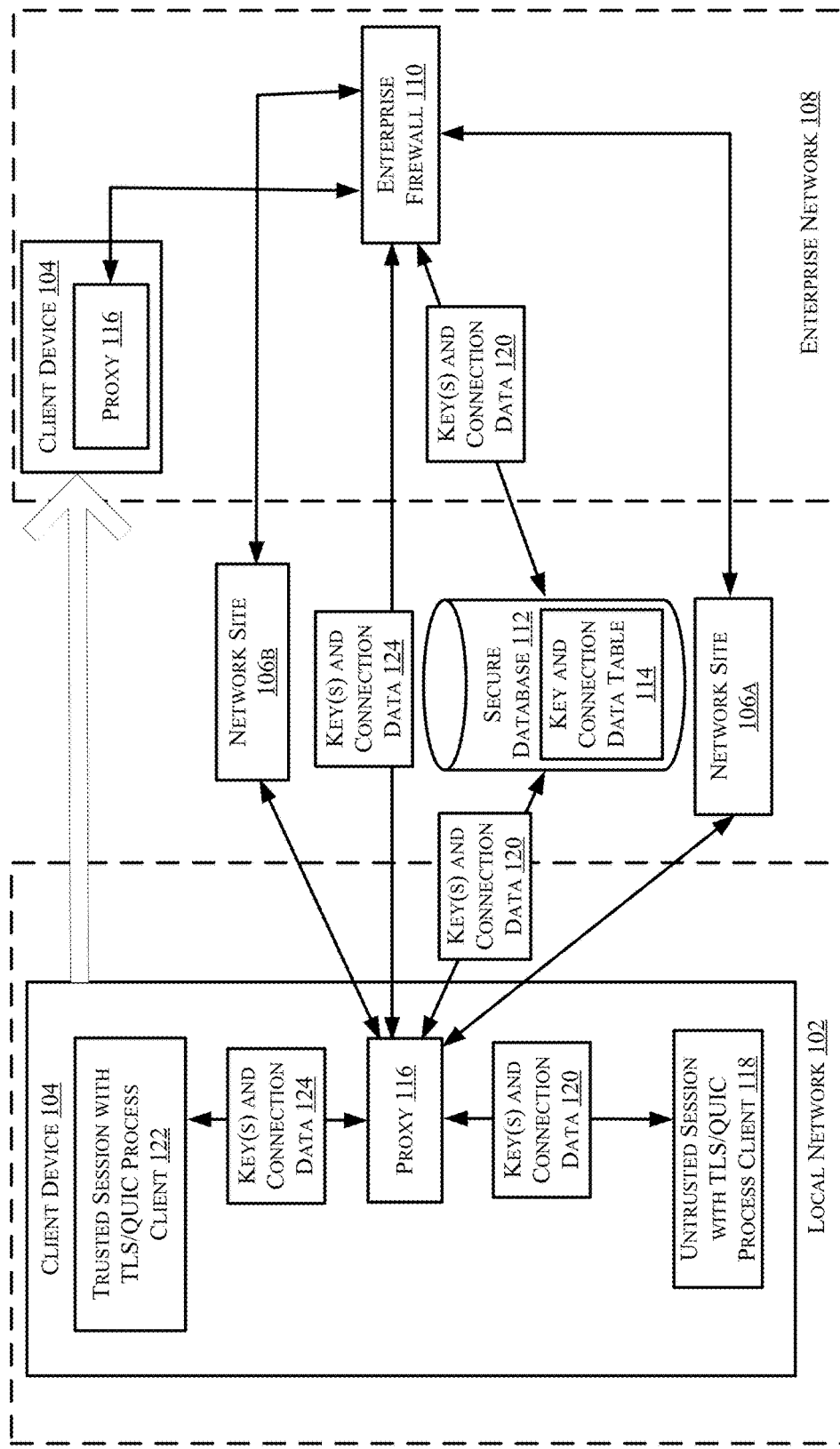
FIGS. 1A and 1B schematically illustrate example portions of networks that include a network device configured to use data such as, for example, keys, connection identifiers, and/or hashes stored in a secure database in order to facilitate client devices remaining connected or reconnecting with network sites when the client device moves among networks and to prevent replay attacks.

This disclosure describes techniques and architecture for providing data such as, for example, keys, connection identifiers, and hashes to network devices such as, for example, firewalls, using a secure database in order to facilitate client devices remaining connected or reconnecting with network sites when the client device moves among networks and to prevent replay attacks. Encryption protocols such as, for example, Transport Layer Security (TLS) 1.3, provide a low latency Zero Round Trip Time Resumption (0-RTT) connection and QUIC provides mechanisms to resume connections with multiple connection identifiers. This makes inspection of data difficult on at least some network devices such as firewalls and security devices as the keys and connection identifiers need to be known a-priori. The techniques and architecture described herein provide a mechanism to deal with such challenges and also provide a way to intercept connections that may have exchanged keys outside an enterprise perimeter, while also improving the performance of the network devices by reducing the crypto operations by approximately half and distributing this load to the network endpoints when possible.

Transport Layer Security (TLS), the successor of the now-deprecated Secure Sockets Layer (SSL), is a cryptographic protocol designed to provide communications security over a computer network. Several versions of the protocol are widely used in applications such as email, instant messaging, and Voice over Internet Protocol (IP) (VoIP), but TLS' use as the security layer in Hypertext Transfer Protocol Secure (HTTPS) remains the most publicly visible. The TLS protocol aims primarily to provide privacy and data integrity between two or more communicating computer applications. The TLS protocol runs in the application layer of the Internet and is itself composed of two layers: the TLS record and the TLS handshake protocols.

TLS 1.3 is the latest version of the Internet's most deployed security protocol, which encrypts data to provide a secure communication channel between two endpoints. TLS 1.3 eliminates obsolete cryptographic algorithms, enhances security over older versions, and aims to encrypt as much of the handshake as possible. TLS 1.3 now uses just 3 cipher suites, all with perfect forward secrecy (PFS), authenticated encryption and additional data (AEAD), and modern algorithms. This addresses challenges with the Internet Assigned Numbers Authority (IANA) TLS registry defining hundreds of cipher suite code points, which often resulted in uncertain security properties or broken interoperability. The TLS 1.3 version also improves privacy by using a minimal set of cleartext protocol bits on the wire, which helps prevent protocol ossification and will facilitate the deployment of future TLS versions. In addition, in TLS 1.3, content length hiding is enabled by a minimal set of cleartext protocol bits. This means that less user information is visible on the network. In previous TLS versions, client authentication exposed client identity on the network unless it was accomplished via renegotiation, which entailed extra round trips and Central Processing Unit (CPU) costs. In TLS 1.3, client authentication is always confidential.

To reduce the time required to establish a new connection between a client device and a network site, e.g., an application server, a client device that has previously connected to a server may cache certain parameters from that connection and subsequently set up a 0-RTT connection with the application server. This allows the client device to send data immediately, without waiting for a handshake to complete. About 60% of the connections are from client devices that are visiting a network site for the first time or revisiting after an extended period of time. TLS 1.3 speeds up these connections significantly. The remaining 40% of connections are from client devices that have recently visited a network site and are resuming a previous connection. For these resumed connections, standard TLS 1.3 is safer but no faster than any previous version of TLS. 0-RTT changes this. 0-RTT dramatically speeds up resumed connections, leading to a faster and smoother Internet experience for network sites that a client device visits regularly. This speed boost is especially noticeable on mobile networks.

QUIC is a general-purpose transport layer network protocol implemented and deployed in 2012, announced publicly in 2013 as experimentation broadened, and described at an IETF meeting. QUIC is used by more than half of all connections from the Chrome web browser to Google's servers. Microsoft Edge, Firefox, and Safari support it, even if not enabled by default.

Although its name was initially proposed as the acronym for "Quick UDP Internet Connections," IETF's use of the word QUIC is not an acronym. QUIC is simply the name of the protocol. QUIC improves performance of connection-oriented web applications that are currently using Transmission Control Protocol (TCP). QUIC does this by establishing a number of multiplexed connections between two endpoints using User Datagram Protocol (UDP) and is designed to obsolete TCP at the network layer for many applications, thus earning the protocol the occasional nickname "TCP/2."

QUIC works hand-in-hand with HTTP/2's multiplexed connections, allowing multiple streams of data to reach all the endpoints independently, and hence independent of packet losses involving other streams. In contrast, HTTP/2 hosted on (TCP) can suffer head-of-line-blocking delays of all multiplexed streams if any of the TCP packets are delayed or lost. QUIC's secondary goals include reduced connection and transport latency, and bandwidth estimation in each direction to avoid congestion. QUIC also moves congestion control algorithms into the user space at both endpoints, rather than the kernel space, which it is claimed will allow these algorithms to improve more rapidly. Additionally, the QUIC protocol can be extended with forward error correction (FEC) to further improve performance when errors are expected, and this is seen as the next step in the QUIC protocol's evolution.

In configurations described herein, a proxy is introduced on an endpoint, e.g., a client device, which is managed by an enterprise. The enterprise provides an enterprise network for accessing internal and external network sites. The proxy maintains and manages all TLS 1.3 or QUIC sessions with network sites, e.g., application servers. The proxy terminates the connections to the network sites from the applications on the endpoint and establishes new connections with the network sites on behalf of the applications on the endpoint. Thus, all the keys including 0-RTT keys are available with this proxy on the endpoint.

In configurations, if a session has been created outside the enterprise network, e.g., the session has been created within a different network, and the client device moves into the enterprise network, these keys and session information are shared with a secure database or security grid that is accessible by enterprise trusted network device(s), e.g., the enterprise firewall. When the traffic from the client device reaches the enterprise firewall, the enterprise firewall checks the secure database or security grid to fetch the keys for this connection.

Thus, the traffic that reaches the enterprise firewall from the client device may be decrypted and inspected without needing to terminate the TLS 1.3 session on the firewall. If malicious content is found in the traffic, the traffic may be blocked or alerted as per the firewall configured policy of the enterprise.

For example, a method may include receiving, by a network device of a first network, first encrypted traffic destined for a network site via the first network from a client device. The method may also include retrieving, by the network device from a database, data related to a previously established connection via a second network of the client device to the network site. In configurations, the data is received by the database from a proxy on the client device. The method may further include based at least in part on the data, passing, by the network device, the first encrypted traffic to the network site. In configurations, the method may further include modifying, by the client device, the data within the database. In configurations, the method may also include receiving, by the network device from the proxy on the client device, one or more keys related to second encrypted traffic related to a previously established connection via the second network of the client device to a trusted network site. In such configurations, the method may also include based at least in part on the one or more keys, passing, by the network device, the second encrypted traffic to the trusted network site. In such configurations, the second encrypted traffic remains encrypted when passed from the network device to the trusted network site. In some configurations, the data comprises one or more keys. In some configurations, the data further comprises one or more connection details related to the previous connection. In some configurations, the data comprises a connection identifier. In some configurations, the data comprises a hash of an encrypted message.

The techniques described herein may be performed by a system and/or device having non-transitory computer-read-

EXAMPLE EMBODIMENTS

In configurations, a proxy is introduced on an endpoint, e.g., a client device, which is managed by an enterprise. The enterprise provides an enterprise network for accessing internal and external network sites. The proxy maintains and manages all TLS 1.3 or QUIC sessions with network sites, e.g., application servers. The proxy terminates the connections to the network sites from the applications on the endpoint and establishes new connections with the network sites on behalf of the applications on the endpoint. Thus, all the keys including 0-RTT keys are available with this proxy on the endpoint.

As previously noted, Transport Layer Security (TLS), the successor of the now-deprecated Secure Sockets Layer (SSL), is a cryptographic protocol designed to provide communications security over a computer network. Several versions of the protocol are widely used in applications such as email, instant messaging, and Voice over Internet Protocol (IP) (VoIP), but TLS' use as the security layer in Hypertext Transfer Protocol Secure (HTTPS) remains the most publicly visible. The TLS protocol aims primarily to provide privacy and data integrity between two or more communicating computer applications. The TLS protocol runs in the application layer of the Internet and is itself composed of two layers: the TLS record and the TLS handshake protocols.

TLS 1.3 is the latest version of the Internet's most deployed security protocol, which encrypts data to provide a secure communication channel between two endpoints. TLS 1.3 eliminates obsolete cryptographic algorithms, enhances security over older versions, and aims to encrypt as much of the handshake as possible. TLS 1.3 now uses just 3 cipher suites, all with perfect forward secrecy (PFS), authenticated encryption and additional data (AEAD), and modem algorithms. This addresses challenges with the Internet Assigned Numbers Authority (IANA) TLS registry defining hundreds of cipher suite code points, which often resulted in uncertain security properties or broken interoperability. The TLS 1.3 version also improves privacy by using a minimal set of cleartext protocol bits on the wire, which helps prevent protocol ossification and will facilitate the deployment of future TLS versions. In addition, in TLS 1.3, content length hiding is enabled by a minimal set of cleartext protocol bits. This means that less user information is visible on the network. In previous TLS versions, client authentication exposed client identity on the network unless it was accomplished via renegotiation, which entailed extra round trips and Central Processing Unit (CPU) costs. In TLS 1.3, client authentication is always confidential.

To reduce the time required to establish a new connection between a client device and a network site, e.g., an application server, a client device that has previously connected to a server may cache certain parameters from that connection and subsequently set up a 0-RTT connection with the application server. This allows the client device to send data immediately, without waiting for a handshake to complete. About 60% of the connections are from client devices that are visiting a network site for the first time or revisiting after an extended period of time. TLS 1.3 speeds up these connections significantly. The remaining 40% of connections are from client devices that have recently visited a network site and are resuming a previous connection. For these resumed connections, standard TLS 1.3 is safer but no faster than any previous version of TLS. 0-RTT changes this. 0-RTT dramatically speeds up resumed connections, leading to a faster and smoother Internet experience for network sites that a client device visits regularly. This speed boost is especially noticeable on mobile networks.

QUIC is a general-purpose transport layer network protocol implemented and deployed in 2012, announced publicly in 2013 as experimentation broadened, and described at an IETF meeting. QUIC is used by more than half of all connections from the Chrome web browser to Google's servers. Microsoft Edge, Firefox, and Safari support it, even if not enabled by default.

Although its name was initially proposed as the acronym for "Quick UDP Internet Connections", IETF's use of the word QUIC is not an acronym. QUIC is simply the name of the protocol. QUIC improves performance of connection-oriented web applications that are currently using Transmission Control Protocol (TCP). QUIC does this by establishing a number of multiplexed connections between two endpoints using User Datagram Protocol (UDP) and is designed to obsolete TCP at the network layer for many applications, thus earning the protocol the occasional nickname "TCP/2."

QUIC works hand-in-hand with HTTP/2's multiplexed connections, allowing multiple streams of data to reach all the endpoints independently, and hence independent of packet losses involving other streams. In contrast, HTTP/2 hosted on (TCP) can suffer head-of-line-blocking delays of all multiplexed streams if any of the TCP packets are delayed or lost. QUIC's secondary goals include reduced connection and transport latency, and bandwidth estimation in each direction to avoid congestion. QUIC also moves congestion control algorithms into the user space at both endpoints, rather than the kernel space, which it is claimed will allow these algorithms to improve more rapidly. Additionally, the QUIC protocol can be extended with forward error correction (FEC) to further improve performance when errors are expected, and this is seen as the next step in the QUIC protocol's evolution.

If a session has been created outside the enterprise network, e.g., the session has been created within a different network, and the client device moves into the enterprise network, these keys and session information are shared with a secure database or security grid that is accessible by enterprise trusted network device(s), e.g., the enterprise firewall. When the traffic from the client device reaches the enterprise firewall, the enterprise firewall checks the secure database or security grid to fetch the keys for this connection.

Thus, the traffic that reaches the enterprise firewall from the client device may be decrypted and inspected without needing to terminate the TLS 1.3 session on the firewall. If malicious content is found in the traffic, the traffic may be blocked or alerted as per the firewall configured policy of the enterprise.

In configurations, for TLS 1.3 sessions that are destined to trusted network sites or categories that mandate "Do Not Decrypt" traffic, such connections information such as, for example, keys, connection identifiers, "Do Not Decrypt," etc. may be retrieved by the enterprise firewall from the secure database or security grid. This allows the enterprise firewall to honor the "Do Not Decrypt" policy on the enterprise firewall and not decrypt the traffic based on the flow parameters conveyed by the client device's proxy to the secure database or security grid.

An example of such a client device proxy includes a Virtual Private Network (VPN) client that has also installed an always-on TLS/QUIC proxy. When the VPN tunnel is established with the enterprise VPN server, the client device proxy passes on the connection details, keys, and/or connection identifiers to the secure database or grid, which is then retrieved by the enterprise firewall when the enterprise firewall encounters any encrypted traffic from the client device and performs traffic inspection.

In certain scenarios, the IP address of the external network site might change depending on the domain name system (DNS) service used within and outside the enterprise network. Thus, the connection details stored on the secure database or security grid may need to also contain the external network site name to ensure the right keys are used. The enterprise firewall may retrieve all the keys of the client device stored on the secure database or security grid in one call so that the enterprise firewall may try to decrypt with any of the keys as needed.

For QUIC sessions, the proxy may be managing all the connection identifiers and session details and these may be communicated via the secure database or security grid to the enterprise firewall. Thus, any migrated connection of the client device with a network site may be intercepted by the enterprise firewall without having to force a TLS 1.3 re-negotiation.

For example, when a connection that uses the fourth generation (4G) protocol or the fifth generation (5G) protocol migrates to the enterprise WiFi network, the IP address of the client device may change. However, the connection identifiers of the QUIC session may still be valid and the client device may be able to re-establish its sessions using the 0-RTT keys. When such a client device now connects to the enterprise network via VPN or by authenticating to the enterprise WiFi network, normally the enterprise firewall may not be able to inspect the traffic since the enterprise firewall may not have been part of the TLS 1.3/QUIC negotiation and thus, does not possess the encryption keys. With the techniques described herein, the TLS 1.3 session keys and other connection details including QUIC connection identifiers and keys may be pushed to the secure database or grid for the enterprise firewall to retrieve and inspect as needed even if the negotiation of the keys were performed beforehand outside the enterprise WiFi network.

The secure database or security grid may an external system where the data is kept in encrypted form. The proxy on the client device may encrypt the session keys (1-RTT and 0-RTT and any other connection details used as part of the TLS 1.3/QUIC communication) with the public key of the secure database or security grid. The enterprise firewalls, and/or other interested entities of the enterprise network, register themselves as trusted agents that may decrypt these keys and access them as needed. From a security standpoint the endpoint, proxy agents may be able to only add the keys in encrypted manner while trusted agents and services such as enterprise firewalls that are trusted by the secure database or security grid may be able to add/modify the security information stored in the secure database or security grid.

With respect to early-data/0-RTT replay attacks, the application servers are protected by the enterprise firewall from incoming traffic. The enterprise firewall front ends the TLS 1.3 traffic for the application server and terminates the TLS 1.3 connections. When content encrypted with 0-RTT keys arrives at the enterprise firewall, the enterprise firewall typically decrypts the packets and sends the plain text data to the application server that then validates if the data it has received has been received previously. So essentially with 0-RTT, the application server also needs modification to add logic to prevent replay attacks.

Using the techniques described herein, the enterprise firewall keeps track of 0-RTT encrypted messages by storing the hash of the encrypted payload in an internal cache of the enterprise firewall or external database such as the secure database or security grid. When a 0-RTT encrypted message intended for the application server reaches the enterprise firewall from a client device, the enterprise firewall computes the hash of the received 0-RTT encrypted message and looks up the hash in the internal cache or the secure database or security grid. If the hash is not found, the enterprise firewall adds the hash of the 0-RTT message to the hash table in the internal cache or the secure database or security grid. If the hash is found in the hash table in the internal cache or the secure database or security grid, then the enterprise firewall may flag the connection as an attack, drops the packet and blocks the sender as an attacker and/or performs any other action as defined by the enterprise's policy.

Thus, the techniques described herein and the secure database 112, which can be used by multiple gateways/firewalls, help ensure that once a 0-RTT/early-data message has been seen on the network, a duplicate message will not reach the network site 106. Thus, the network site 106 does need not be modified to specifically handle early-data/0-RTT replay attacks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A schematically illustrates an example portion of a first network, e.g., a local network, 102. A client device 104 is included in the first network 102. The client device 102 has established a session with a first network site or application server 106a (referred to herein as network site 106a) via the first network 102. The client device 102 has also established a session with a second network site or application server 106b (referred to herein as network site 106b) via the first network 102. FIG. 1A also schematically illustrates a portion of a second network 108, which in configurations is an enterprise network, e.g., a network owned, operated, and/or managed by an enterprise, e.g., a business, an organization, etc. The second network 108 includes an enterprise firewall 110 (or other security device). In configurations, the enterprise firewall 110 may be a virtual firewall. A secure database or security grid 112 (referred to herein as secure database 112) is also illustrated. The secure database 112 includes a key and connection data table 114. The secure database 112 may be external to one or both of the first and second networks 102, 108, or may be part of one of the first and second networks 102, 108. In configurations, a proxy 116 is included on the client device 104, as will be described further herein.

The client device 104 has a session or connection 118 with network site 106a via a TLS/QUIC client on the client device 104 routed through the proxy 116 on the client device. Since the network site 106a is not a trusted site, the session or connection 118 is an untrusted session or connection. Keys and/or connection data 120 related to the session or connection 118 are provided to the proxy 116. The client device 104 has a session or connection 122 with network site 106a via a TLS/QUIC client on the client device 104 routed through the proxy 116 on the client device. Keys and/or connection data 124 related to the session or connection 122 are provided to the proxy 116.

As can be seen in FIG. 1A, the client device 104 moves into the second network 108. The client device 104 wishes to continue its current sessions 118, 122 with the network sites 106a, 106b via the second network 108 or, if needed, re-establish the sessions 118, 122 with the network sites 106a, 106b, as will be described herein.

In configurations, the proxy 116 is managed by the enterprise. As previously noted, in configurations, the enterprise provides the second network 108 for accessing internal and external network sites, e.g., network sites 106a, 106b. The proxy 116 maintains and manages all TLS 1.3 or QUIC sessions, e.g., sessions 118, 122, with network sites, e.g., network sites 106a, 106b. The proxy 116 terminates the connections to network sites (e.g., network sites 106a, 106b) from applications on the client device 104 and establishes new connections with the network sites 106a, 106b on behalf of the applications on the client device 104. Thus, all the keys 118, 122, including 0-RTT keys, are available with the proxy 116 on the client device 104.

If a session has been created outside the second network 108, e.g., the session has been created within the first network 102, and the client device 104 moves into the second network 108, data such as, for example, the keys, session information, and/or connection information 120 are shared with the secure database 112 that is accessible by enterprise trusted network device(s), e.g., the enterprise firewall 110. The keys, session information, and/or connection information 118 are stored within the key and connection data table 114 within the secure database 112. When traffic from the client device 104 reaches the enterprise firewall 110, the enterprise firewall 110 checks key and connection data table 114 within the secure database 112 to fetch the keys, session information, and/or connection information 120 for the session or connection 118 with the network site 106a.

Thus, the traffic that reaches the enterprise firewall 110 from the client device 104 may be decrypted and inspected without needing to terminate the TLS 1.3 session on the enterprise firewall 110. If malicious content is found in the traffic, the traffic may be blocked or alerted as per the enterprise firewall configured policy of the enterprise.

In configurations, for TLS 1.3 sessions that are destined to trusted network sites, e.g., network site 106b, or network site categories that mandate "Do Not Decrypt" traffic, such connection information 124 such as, for example, keys, connection identifiers, "Do Not Decrypt," etc., may be retrieved by the enterprise firewall 110 from the proxy 116. This allows the enterprise firewall 110 to honor the "Do Not Decrypt" policy on the enterprise firewall 110 and not decrypt the traffic based on the flow parameters conveyed by the client device's proxy 116. In configurations, the keys and connection data 124 may be additionally or alternatively may be provided by the proxy 116 to the key and connection data table 114 within the secure database 112. Thus, in such configurations, the enterprise firewall 110 may retrieve the keys and connection data 124 from the secure database 112.

In configurations, an example of a client device proxy 116 includes a Virtual Private Network (VPN) client that has also installed an always-on TLS/QUIC proxy. When a VPN tunnel is established with an enterprise VPN server, the client device proxy 116 passes on the connection details, keys, and/or connection identifiers 120 (and in some configurations, the connection details, keys, and/or connection identifiers 124) to the secure database 112, which may then retrieved by the enterprise firewall 110 when the enterprise firewall 110 encounters any encrypted traffic from the client device 104 and performs traffic inspection.

In certain scenarios, the IP address of the external network site 106 might change depending on the domain name system (DNS) service used within and outside the second network 108. Thus, the connection details 120 (and possibly 124) stored on the secure database 112 may need to also contain the external network site name 106a (and possibly 106b) to ensure the correct keys are used. The enterprise firewall 110 may retrieve all the keys of the client device 104 stored on the secure database 112 in one call so that the enterprise firewall 110 may try to decrypt with any of the keys as needed.

For QUIC sessions, the proxy 116 may be managing all the connection identifiers and session details and these may be communicated via the secure database 112 to the enterprise firewall 110 via keys and connection data 120, 124. Thus, any migrated connection of the client device 104 with a network site, e.g., network sites 106a, 106b, may be intercepted by the enterprise firewall 110 without having to force a TLS 1.3 re-negotiation.

For example, when a connection that uses the fourth generation (4G) protocol or the fifth generation (5G) protocol migrates to the second network 108, which in this example is in the form of an enterprise WiFi network, the IP address of the client device 104 may change. However, the connection identifiers of the QUIC session may still be valid and the client device 104 may be able to re-establish its sessions using the 0-RTT keys. When such a client device 104 now connects to the second network 108 via VPN or by authenticating to the enterprise WiFi network, normally the enterprise firewall 110 may not be able to inspect the traffic since the enterprise firewall 110 may not have been part of the TLS 1.3/QUIC negotiation and thus, does not possess the encryption keys. With the techniques described herein, the TLS 1.3 session keys and other connection details including QUIC connection identifiers and keys 120 (and possibly the TLS 1.3 session keys and other connection details including QUIC connection identifiers and keys 124) may be pushed to the secure database 112 for the enterprise firewall 110 to retrieve and inspect as needed even if the negotiation of the keys were performed beforehand outside the enterprise WiFi network.

In configurations, the secure database 112 may be an external system where the data is kept in encrypted form. The proxy 116 on the client device 104 may encrypt the session keys 120 (1-RTT and 0-RTT and any other connection details used as part of the TLS 1.3/QUIC communication) with a public key of the secure database 112. The enterprise firewalls 110, and/or other interested entities of the second network 108, register themselves as trusted agents that may decrypt these keys and access them as needed from the secure database 112. From a security standpoint, the client device 104, proxy agents 116 may be able to only add the keys in encrypted manner, while trusted agents and services such as enterprise firewalls 110 that are trusted by the secure database 112, may be able to add/ modify the security information stored in the secure database 112. In configurations, subsequent TLS key updates and any other security material updates including new keys and connection data 120 and/or 124 may also be communicated to the enterprise firewall 110 by the proxy 116 via the secure database.

Figure 1B:
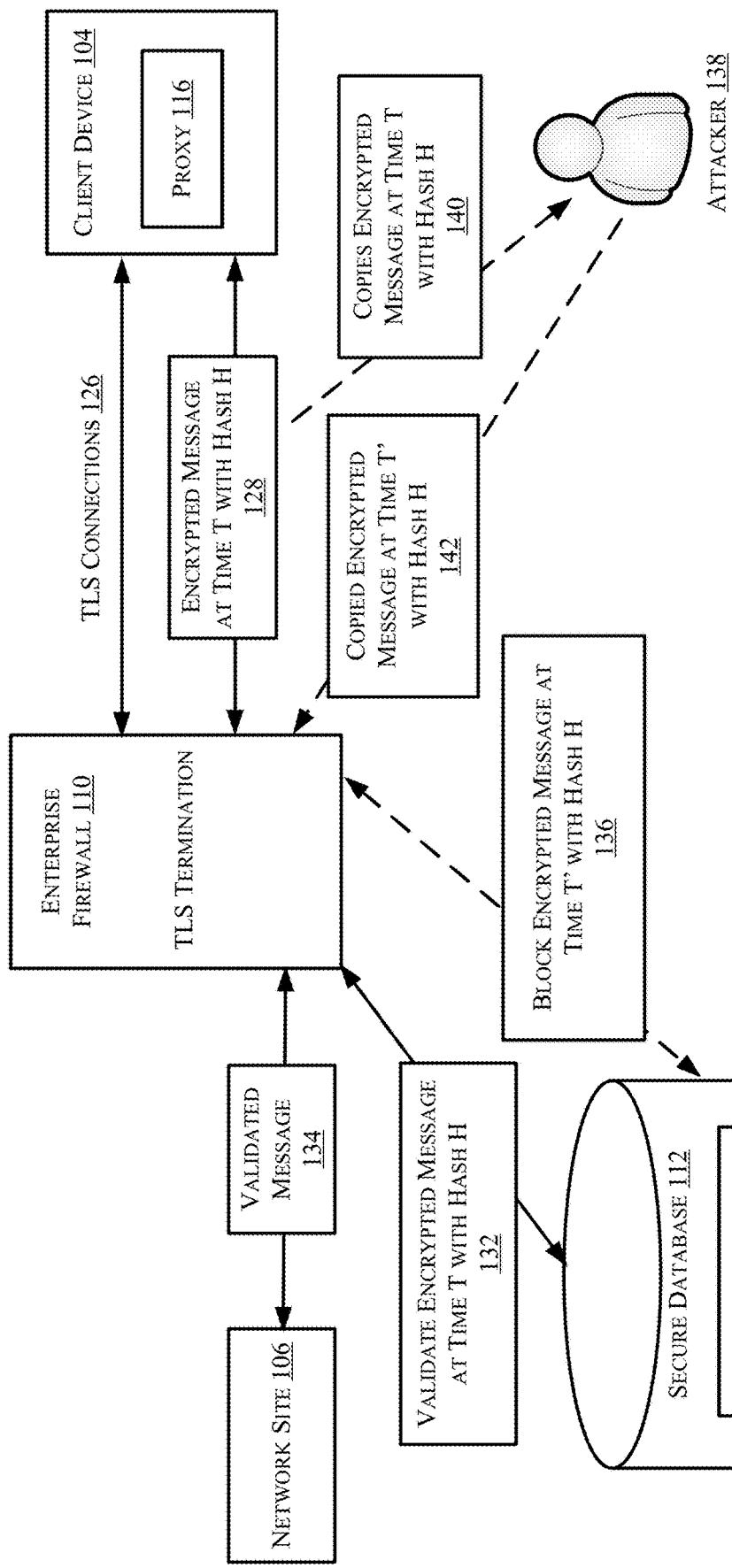

Referring to FIG. 1B, with respect to early-data/0-RTT replay attacks, the network site 106 is protected by the enterprise firewall 110 from incoming traffic. The enterprise firewall 110 front ends the TLS 1.3 traffic for the network site 106 and terminates the TLS 1.3 connections 126. When content encrypted with 0-RTT keys, e.g., encrypted message 128, arrives at the enterprise firewall 110, the enterprise firewall 110 typically decrypts the packets and sends the plain text data to the network site 106 that then validates if the data it has received has been received previously. So essentially with 0-RTT, the network site 106 also needs modification to add logic to prevent replay attacks.

Using the techniques described herein, the enterprise firewall 110 keeps track of 0-RTT encrypted messages by storing the computed hash of the encrypted payload with a time T that the encrypted message 128 was received in a hash/timestamp table 130 located in an internal cache of the enterprise firewall 110 or an external database such as the secure database 110. When the 0-RTT encrypted message 128 intended for the network site 106 reaches the enterprise firewall 110 from the client device 104, the enterprise firewall 110 validates 0-RTT encrypted message 128 at 132 by computing the hash H of the received 0-RTT encrypted message 128 and looking the hash up in the hash/timestamp table 130 in the secure database 112. If the hash is not found, the validated message 134 is forwarded on to the network site 106. The enterprise firewall 110 also adds the hash H of the 0-RTT encrypted message with a receipt timestamp T to the hash/timestamp table 130 in the secure database 112.

However, if the hash H is found in the hash table 130 in the secure database 112, then the enterprise firewall 110, at 136, may flag the connection as an attack, blocks (drops) the 0-RTT encrypted message, blocks the sender as an attacker 138, and/or performs any other action as defined by the enterprise's policy. For example, in a replay attack if the attacker 138 copies the 0-RTT encrypted message 128 at time T at 140, the attacker 138 may then, at 142, send a copy of the 0-RTT encrypted message 128 with its hash H but at time T'. When the enterprise firewall 110 computes the hash H of the copied encrypted message 128 and checks the hash H and timestamp T' of the copied 0-RTT encrypted message 128 in the hash/timestamp table 130 in the secure database 112, the hash H with timestamp T will be found by the enterprise firewall 110. Since the copied 0-RTT encrypted message 128 will have the same hash H but with timestamp T', the enterprise firewall 110, at 136, may flag the connection as an attack, blocks (drops) the 0-RTT encrypted message, blocks the sender as an attacker 138, and/or performs any other action as defined by the enterprise's policy, based on the discovered hash and/or the timestamp T'.

Thus, the techniques described herein and the secure database 112, which can be used by multiple gateways/firewalls, help ensure that once a 0-RTT/early-data message has been seen on the network, a duplicate message will not reach the network site 106. Thus, the network site 106 does need not be modified to specifically handle early-data/0-RTT replay attacks.

Figure 3:
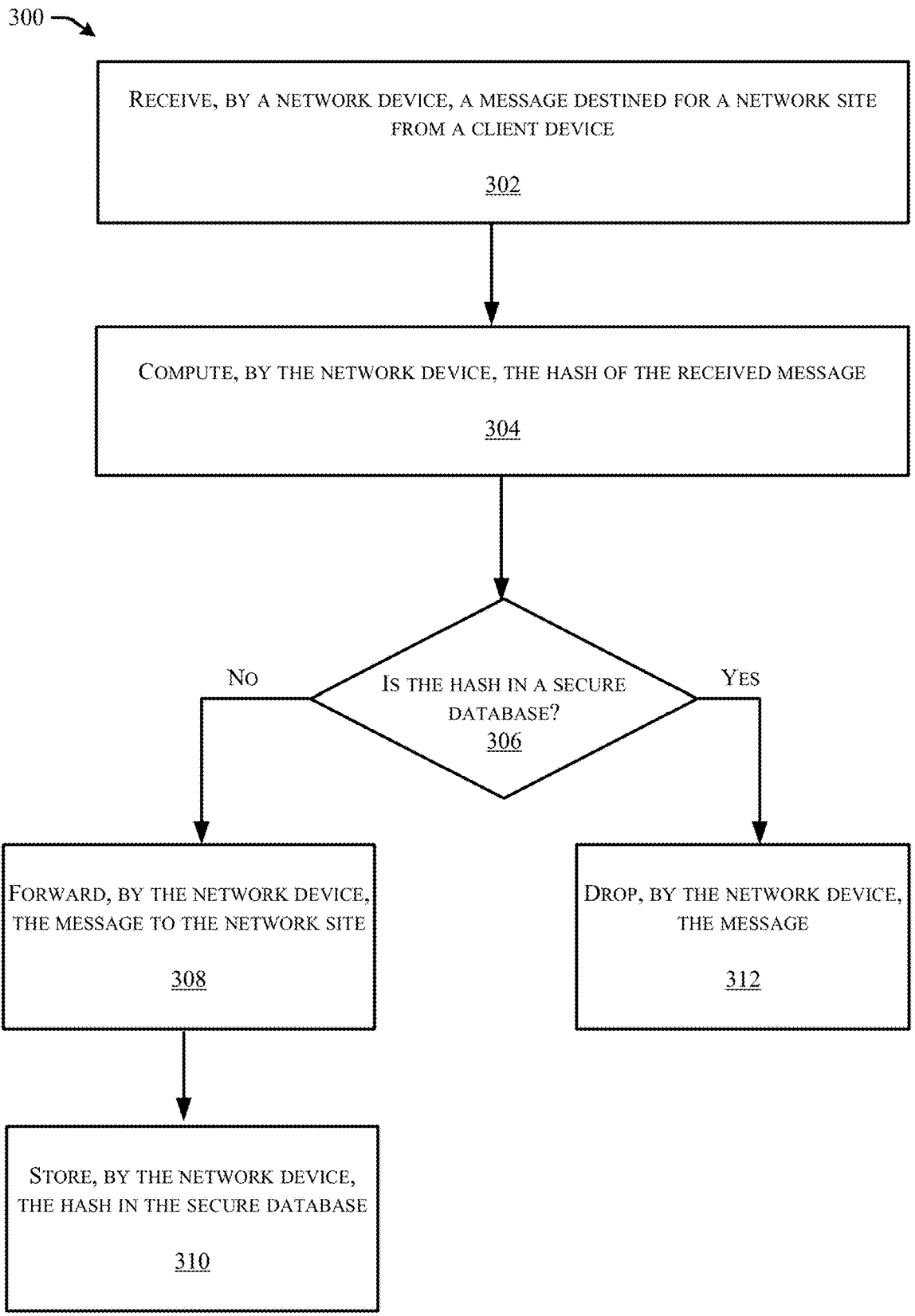
FIG. 3 illustrates a flow diagram of an example method for storing data such as, for example, messages from network devices such as, for example, firewalls, in a secure database in order to prevent replay attacks.

FIGS. 2 and 3 illustrate a flow diagram of example methods 200 and 300 and illustrate aspects of the functions performed at least partly by a network device of a network as described with respect to FIGS. 1A and 1B. The logical operations described herein with respect to FIGS. 2 and 3 may be implemented (1) as a sequence of computer-implemented acts or program modules running on a computing system, and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 2 and 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 2 illustrates a flow diagram of an example method 200 for providing connection data such as, for example, keys and connection identifiers to network devices such as, for example, firewalls, using a secure database in order to facilitate client devices remaining connected or reconnecting with network sites when the client device moves among networks. In some examples, the method 200 may be performed by a system comprising one or more processors and one or more non-transitory computer-readable media storing computer-executable instructions that, when executed by the one or more processors, cause the one or more processors to perform the method 200.

At 202, a network device of a first network receives traffic destined for a network site via the first network from a client device. At 204, data related to a previously established connection via a second network of the client device to the network site is received from a database. In configurations, the data is received by the database from a proxy on the client device. In configurations, the data comprises one or more keys. In some configurations, the data further comprises one or more connection details related to the previous connection. In configurations, the data comprises a connection identifier. In some configurations, the data comprises a hash of an encrypted message.

At 206, based at least in part on the data, the network device passes the traffic to the network site. In configurations, the network device comprises a firewall, e.g., enterprise firewall 110. In some configurations, the firewall comprises a virtual firewall.

FIG. 3 illustrates a flow diagram of an example method 300 for storing data such as, for example, messages from network devices such as, for example, firewalls, in a secure database in order to prevent replay attacks. In some examples, the method 300 may be performed by a system comprising one or more processors and one or more non-transitory computer-readable media storing computer-executable instructions that, when executed by the one or more processors, cause the one or more processors to perform the method 300.

At 302, a network device of a network receives a message destined for a network site from a client device. In configurations, the message is a 0-RTT encrypted message. In configurations, the network device comprises a firewall, e.g., enterprise firewall 110. In some configurations, the firewall comprises a virtual firewall.

At 304, the network device computes the hash of the received message. At 306, the network device looks up the hash in the secure database, e.g., secure database 106, and determines if the hash is in the secure database. At 308, if the hash is not in the secure database, the network device forwards the message to the network site, e.g., network site 106 and at 310 the network device stores the hash in the secure database. At 312, if the hash is in the secure database, the network device drops the message. The network device may also flag the connection as an attack and block the sender and/or perform any other action as defined by the enterprise's policy.

Figure 4:
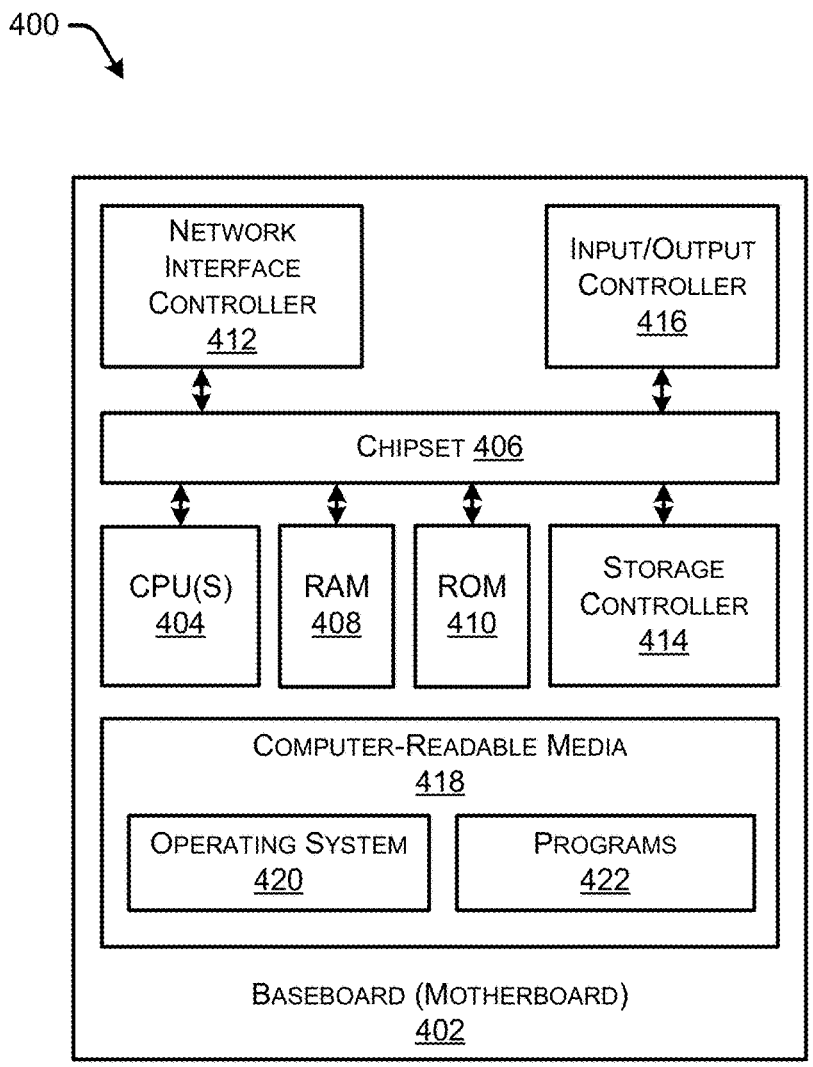
FIG. 4 is a computer architecture diagram showing an illustrative computer hardware architecture for implementing a network device that can be utilized to implement aspects of the various technologies presented herein.

FIG. 4 shows an example computer architecture for a computing device 402 capable of executing program components for implementing the functionality described above. In configurations, the computing device 402 may be used to implement network device 104 or network site (application server) 106, for example. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 402 may, in some examples, correspond to a physical devices or resources described herein.

The computing device 402 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 402.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 402. The chipset 406 can further provide an interface to a computer-readable storage medium such as a read-only memory ("ROM") 410 or non-volatile RAM ("NVRAM") for storing basic routines that help to startup the computing device 402 and to transfer information between the various components and devices. The ROM 410 or NVRAM can also store other software components necessary for the operation of the computing device 402 in accordance with the configurations described herein.

The computing device 402 can operate in a networked environment using logical connections to remote computing devices and computer systems through a network, such as the network 408. The chipset 406 can include functionality for providing network connectivity through a NIC 412, such as a gigabit Ethernet adapter. The NIC 412 is capable of connecting the computing device 402 to other computing devices over the network 408. It should be appreciated that multiple NICs 412 can be present in the computing device 402, connecting the computer to other types of networks and remote computer systems.

The computing device 402 can be connected to a storage device 418 that provides non-volatile storage for the computer. The storage device 418 can store an operating system 420, programs 422, and data, which have been described in greater detail herein. The storage device 418 can be connected to the computing device 402 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 402 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 402 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 402 can further read information from the storage device 418 by detecting the physical states or characteristics of one or more particular locations within the physical storage units.

In addition to the mass storage device 418 described above, the computing device 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 402. In some examples, the operations performed by the cloud computing network, and or any components included therein, may be supported by one or more devices similar to computing device 402. Stated otherwise, some or all of the operations described herein may be performed by one or more computing devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 402. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 402.

In one embodiment, the storage device 418 or other computer-readable storage media is encoded with computer-executable instructions which, when loaded into the computing device 402, transform the computer from a general-purpose computing system into a special-purpose computer capable of implementing the embodiments described herein. These computer-executable instructions transform the computing device 402 by specifying how the CPUs 404 transition between states, as described above. According to one embodiment, the computing device 402 has access to computer-readable storage media storing computer-executable instructions which, when executed by the computing device 402, perform the various processes described above with regard to FIGS. 1-3. The computing device 402 can also include computer-readable storage media having instructions stored thereupon for performing any of the other computer-implemented operations described herein.

The computing device 402 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 402 might not include all of the components shown in FIG. 4, can include other components that are not explicitly shown in FIG. 4, or might utilize an architecture completely different than that shown in FIG. 4.

The computing device 402 may support a virtualization layer, such as one or more virtual resources executing on the computing device 402. In some examples, the virtualization layer may be supported by a hypervisor that provides one or more virtual machines running on the computing device 402 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    upon movement of a client device into an enterprise network from a second network, receiving, by an enterprise firewall of the enterprise network, first encrypted traffic destined for a network site via the enterprise network from the client device, wherein the client device has a previously established connection to the network site via the second network prior to moving into the enterprise network;
    retrieving, by the enterprise firewall from a database, data related to the previously established connection via the second network of the client device to the network site, wherein the data is received by the database from a proxy on the client device;
    based at least in part on the data, passing, by the enterprise firewall, the first encrypted traffic to the network site;
    receiving, by the enterprise firewall from the proxy on the client device, one or more keys related to a second encrypted traffic, wherein the second encrypted traffic is related to another previously established connection via the second network of the client device to a trusted network site; and
    based at least in part on the one or more keys, passing, by the enterprise firewall, the second encrypted traffic to the trusted network site.

2. The method of claim 1, further comprising: modifying, by the enterprise firewall, the data within the database.

3. The method of claim 1, wherein the second encrypted traffic remains encrypted when passed from the enterprise firewall to the trusted network site.

4. The method of claim 1, wherein the data comprises the one or more keys.

5. The method of claim 4, wherein the data further comprises one or more connection details related to the previously established connection.

6. The method of claim 1, wherein the data comprises a connection identifier.

7. A system comprising:
    one or more processors; and
    one or more non-transitory computer-readable media storing computer-executable instructions that, when executed by the one or more processors, cause the one or more processors to perform actions comprising:
        upon movement of a client device into an enterprise network from a second network, receiving, by an enterprise firewall of the enterprise network, first encrypted traffic destined for a network site via the enterprise network from the client device, wherein the client device has a previously established connection to the network site via the second network prior to moving into the enterprise network;
    retrieving, by the enterprise firewall from a database, data related to the previously established connection via the second network of the client device to the network site, wherein the data is received by the database from a proxy on the client device; and
    based at least in part on the data, passing, by the enterprise firewall, the first encrypted traffic to the network site;
    receiving, by the enterprise firewall from the proxy on the client device, one or more keys related to a second encrypted traffic, wherein the second encrypted traffic is related to another previously established connection via the second network of the client device to a trusted network site; and
    based at least in part on the one or more keys, passing, by the enterprise firewall, the second encrypted traffic to the trusted network site.

8. The system of claim 7, wherein the actions further comprise: modifying the data within the database.

9. The system of claim 7, wherein the second encrypted traffic remains encrypted when passed, by the enterprise firewall, to the trusted network site.

10. The system of claim 7, wherein the data comprises said one or more keys.

11. The system of claim 10, wherein the data further comprises one or more connection details related to the previously established connection.

12. The system of claim 7, wherein the data comprises a connection identifier.

13. One or more non-transitory computer-readable media storing computer-executable instructions that, when executed by one or more processors, cause the one or more processors to perform actions comprising:
  upon movement of a client device into an enterprise network from a second network, receiving, by an enterprise firewall of the enterprise network, first encrypted traffic destined for a network site via the enterprise network from the client device, wherein the client device has a previously established connection to the network site via the second network prior to moving into the enterprise network;
  retrieving, by the enterprise firewall from a database, data related to the previously established connection via the second network of the client device to the network site, wherein the data is received by the database from a proxy on the client device; and
  based at least in part on the data, passing, by the enterprise firewall, the first encrypted traffic to the network site;
  receiving, by the enterprise firewall from the proxy on the client device, one or more keys related to a second encrypted traffic, wherein the second encrypted traffic is related to another previously established connection via the second network of the client device to a trusted network site; and
  based at least in part on the one or more keys, passing, by the enterprise firewall, the second encrypted traffic to the trusted network site.

14. The one or more non-transitory computer-readable media of claim 13, wherein the actions further comprise: modifying the data within the database.

15. The one or more non-transitory computer-readable media of claim 13, wherein the second encrypted traffic remains encrypted when passed, by the enterprise firewall, to the trusted network site.

16. The one or more non-transitory computer-readable media of claim 13, wherein the data comprises said one or more keys.

17. The one or more non-transitory computer-readable media of claim 16, wherein the data further comprises one or more connection details related to the previously established connection.

18. The one or more non-transitory computer-readable media of claim 13, wherein the data comprises a connection identifier.

* * * * *